United States Patent [19]

Harsdorff

[11] Patent Number: 4,647,231
[45] Date of Patent: Mar. 3, 1987

[54] MULTIPLE-ROW TAPERED ROLLING BEARING AND DISASSEMBLY METHOD

[75] Inventor: Ortwin Harsdorff, Zell, Fed. Rep. of Germany

[73] Assignee: SKF GmbH, Schweinfurt, Fed. Rep. of Germany

[21] Appl. No.: 785,898

[22] Filed: Oct. 9, 1985

[30] Foreign Application Priority Data

Oct. 11, 1984 [DE] Fed. Rep. of Germany ... 8429899[U]

[51] Int. Cl.[4] .............................................. F16C 19/38
[52] U.S. Cl. .................................................... 384/560
[58] Field of Search ............... 384/559, 475, 571, 903, 384/560, 561, 569; 308/DIG. 11

[56] References Cited

U.S. PATENT DOCUMENTS 2,054,581  9/1936  Detaval-Crow .................... 384/475
3,241,895  3/1966  Fisher ................................. 384/559
3,730,599  5/1973  Fingerle ............................. 384/475

FOREIGN PATENT DOCUMENTS 1768081  3/1958  Fed. Rep. of Germany .

Primary Examiner—Lenard A. Footland
Attorney, Agent, or Firm—Rosen, Dainow & Jacobs

[57] ABSTRACT

A multiple-row tapered rolling bearing in an O-arrangement has an outer ring, a pair of abutting inner rings, and tapered rolling bodies arranged therebetween. The inner rings are axially secured together by a clamping ring which form-locks with annular grooves formed in the inner rings. A bore is provided in the outer ring which is adopted to allow a separating tool to be passed therethrough. The separating tool has a cutting edge which is impressed on the clamping ring during relative rotation of the outer and inner rings, thereby severing the clamping ring for disassembling the bearing.

6 Claims, 1 Drawing Figure

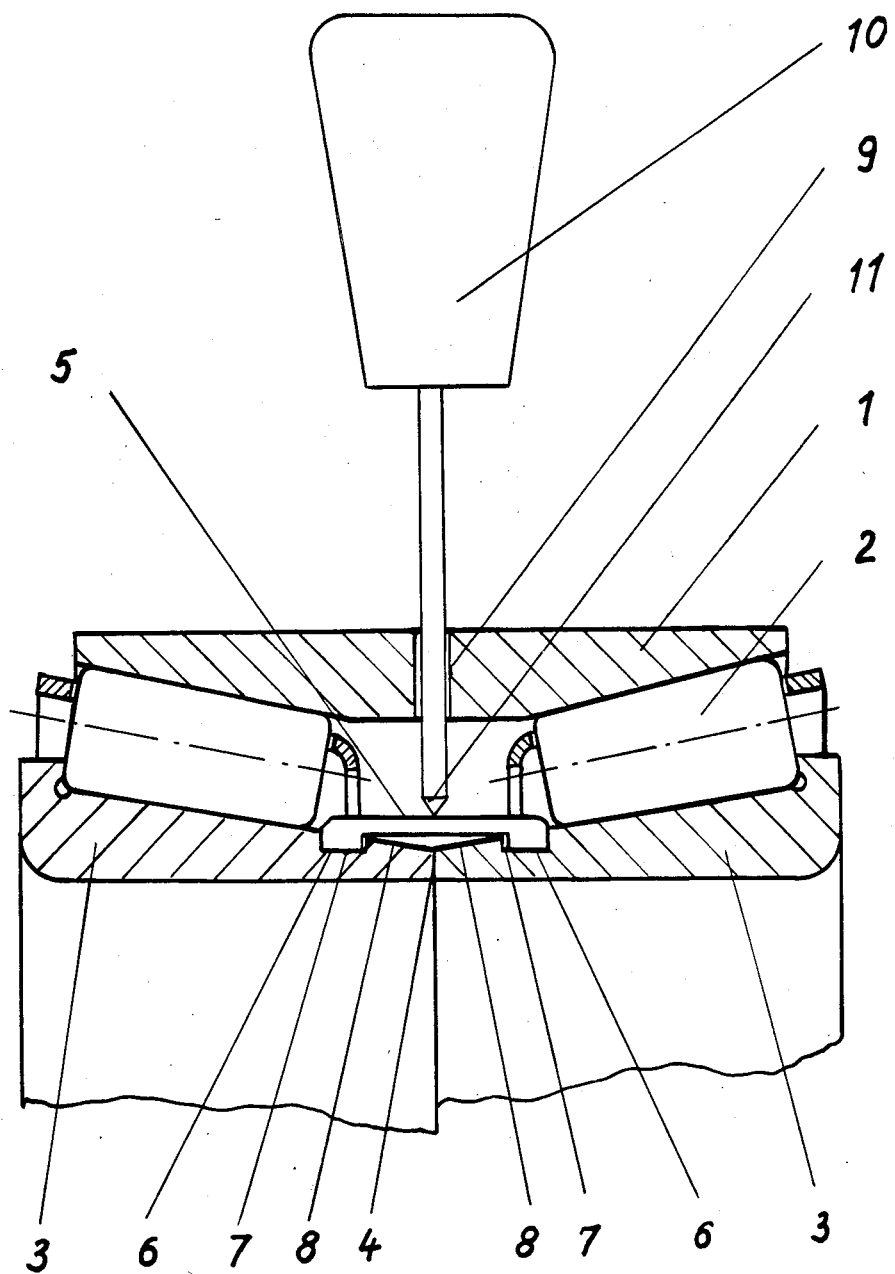

MULTIPLE-ROW TAPERED ROLLING BEARING AND DISASSEMBLY METHOD

FIELD OF THE INVENTION

The invention relates to a multiple-row tapered rolling bearing in an O-arrangement and a method for disassembling such a bearing.

BACKGROUND OF THE INVENTION

A rolling bearing of the aforementioned type is disclosed in DE-GM No. 1 768 081, wherein both inner rings are provided with shoulders only on their axially outer sides. In the area of the axially inner sides no shoulders are provided; the outer diameter is here the same as the raceway diameter, so that each inner ring can have loads exerted thereon in only one axial direction, namely from the inside of the rolling bearing. In accordance with this construction, the inner rings can be introduced from the sides in a final work step during assembly of the bearing, wherein the side surfaces of the inner rings are in mutually abutting relation, and the inner rings are held together in the axial and radial directions by means of a clamping ring. The clamping ring engages annular grooves in the area of the outer surfaces of the respective inner rings by form-locking. The elastic construction of the clamping ring enables the snapping of the ring into the respective annular grooves during pressing together of the inner rings. In this way the rolling bearing is assembled, whereby the inner rings, without the provision of further means, can no longer be separated. To enable separation, e.g. for the purpose of repairing a large expensive rolling bearing, in accordance with this known construction a radial through-hole is provided in the vicinity of the abutting surfaces of the inner rings, in which a separating tool is inserted for axially pushing the inner rings apart, to forcibly remove the clamping ring from the annular grooves. A new clamping ring is then used for reassembly of the bearing. Although this method is fundamentally without fault, the forcible manipulation of the separating tool which is required can result in damage to the side surfaces as well as the bore surfaces of the inner rings. Furthermore, the firmness of the form-locking between the clamping ring and the inner rings cannot be optionally increased since the assembly must be sufficiently yielding to enable separation of the inner rings, i.e. by distending the clamping ring until it is forced out of the annular grooves.

SUMMARY OF THE INVENTION

The object of the invention is to provide a multiple-row tapered rolling bearing of the known type such that the bearing can be disassembled without damaging the bearing rings and a restriction of the degree of firmness of the form-locking between the clamping ring and the inner rings is not necessary.

This object is achieved in accordance with the invention by providing a radial through-hole in the outer ring in the area of the clamping ring, through which a separating tool is passed. This tool is then used to sever the clamping ring along a circumferential line.

In the preferred embodiment of the invention, a separating tool, for example, having a cutting edge, is introduced from the radially outer side of the bearing and as the inner ring is rotated, a radial pressure is applied by means of the tool against the clamping ring, which is severed by the cutting edge. This arrangement is advantageous in that none of the functional surfaces of the bearing rings are damaged. Also, any forcible pressing of the separating tool is unnecessary. The formation of a separation groove in the clamping ring can take place over many rotations, so that the radial and transverse forces applied by way of the separating tool can be small in magnitude. Advantageously, the firmness of the form-locking between the clamping ring and the inner rings has no effect on the disassembly of the bearing rings since the clamping ring is cut along its axial middle. Therefore, the annular grooves and the lateral portions of the clamping ring can be formed to meet variable specifications with respect to the firmness of the form-locking. For reassembly of the bearing, a new clamping ring is form-locked into the annular grooves formed in the inner rings.

In accordance with a further embodiment of the invention, the clamping ring has a circular predetermined separation line or is made of plastic. In both cases the separation process is considerably simplified. If the clamping ring is made of sheet steel, a shearing tool can also be utilized as the cutting tool, by means of which a separation line can be realized by radial impression. Also a tool with cutting rollers can be provided for cutting the clamping ring in an embodiment of suitable construction. In the embodiment comprising a clamping ring made of plastic, a very small cutting power is required.

In accordance with another embodiment of the invention, the recess for receiving the cutting tool is a bore formed in a radial plane and inclined relative to the radius. In this way the cutting tool can be disposed at an incline. In the course of cutting the clamping ring, a tip force is produced which can be impressed on the cutting tool, e.g. by an automatic retracing, so that the cutting tool is automatically guided accurately, i.e. with small expenditure of energy.

BRIEF DESCRIPTION OF THE DRAWING

The preferred embodiment of the invention will hereinafter be described in detail with reference to the drawing.

DETAILED DESCRIPTION OF THE PREFERRED EMBODIMENT

The single FIGURE of the drawing is a sectional longitudinal view of a two-row tapered rolling bearing with a separating tool inserted through the outer ring. The bearing comprises a common outer ring 1 with two raceways, two sets of tapered rollers 2, and two separate inner rings 3. The embodiment depicted is an O-arrangement. Thus, the raceways of the inner rings are inclined radially and axially inwardly, i.e. the radius of the raceway decreases toward the inside of the tapered rolling bearing, whereby the correspondingly inclined main loading directions are produced with radially inwardly and axially outwardly directed force components in each case. Each of the inner rings 3 can accordingly to this arrangement be inserted in the outer ring from the respective axially outer side with tapered rollers 2 inserted. In order to secure both inner rings 3 in the correct axial position, with the inner side surfaces 4 abutting one another, a plastic clamping ring 5 of substantially U-shaped profile is provided. The plastic ring may be annular. The clamping ring 5 comprises a sleeve portion and radially inwardly directed, annular lateral portions 6 at each end of the sleeve portion, which lateral portions engage the corresponding annular grooves 7 formed in the inner rings 3 by form-locking. The clamping ring 5 is thrust onto the raceways of the inner rings 3 during assembly. Each inclined inner ring surface 8 extending to the corresponding side surface 4 serves as a starting ramp for the clamping ring during insertion of the inner ring until the annular lateral portions 6 of the clamping ring 5 are snapped into the annular groove 7.

In order to disassemble the tapered rolling bearing of the invention, the clamping ring must be destroyed. To this end, a radially directed bore 9 is provided in the axial middle of the outer ring 1, through which a separating tool with a cutting edge is inserted. By the rotation of the inner ring 3 with respect to the outer ring 1 and the application of a radial load on the separating tool, the clamping ring 5 can be cut along a circumferential line in the axial middle in such a manner that the clamping ring is completely severed in one rotation. Thereafter, each of the inner rings 3 can be laterally withdrawn. In order to assemble the bearing anew, a new clamping is inserted after removal of the remains of the damaged clamping ring 5.

The foregoing description of the preferred embodiment is presented for illustrative purposes only and is not intended to limit the scope of the invention as defined in the appended claims. Modifications may be readily effected by one having ordinary skill in the art without departing from the spirit and scope of the inventive concept herein disclosed.

What is claimed is:

1. In a multiple-row tapered rolling bearing comprising an outer ring, first and second pluralities of rolling bodies, and a pair of inner rings axially connected by a clamping ring interlocked with respective grooves formed in said inner rings, said inner rings having side surfaces in abutting relation, the improvement wherein a through-hole is provided in said outer ring radially aligned with said clamping ring, said through-hole being formed to enable passage of a tool therethrough to engage said clamping ring during rotation of said clamping ring relative to said outer ring and thereby sever said clamping ring along a circumferential line thereof.

2. The multiple-row tapered rolling bearing of claim 1, wherein said clamping ring has a circular separation line formed therein.

3. The multiple-row tapered rolling bearing of claim 1, wherein said clamping ring is made of plastic.

4. The multiple-row tapered rolling bearing of claim 1, wherein said through-hole is a bore disposed along a radial line extending from the axis of rotation of the bearing.

5. The multiple-row tapered rolling bearing of claim 1, wherein said through-hole is a bore lying in a radial plane, said bore not being disposed along a radial line extending from the axis of rotation of the bearing.

6. In a multiple-row tapered rolling bearing comprising an outer ring, first and second pluralities of rolling bodies, and a pair of inner rings axially connected by a clamping ring interlocked with respective grooves formed in said inner rings, said inner rings having side surfaces in abutting relation, the improvement wherein a through-hole is provided in said outer ring radially aligned with said clamping ring, an inner end of said through-hole opposing an outer circumferential surface of said clamping ring, said through-hole being formed to enable passage of a tool therethrough to engage said clamping ring during rotation of said clamping ring relative to said outer ring and thereby sever said clamping ring along a circumferential line thereof.

* * * * *